Patented Dec. 3, 1940

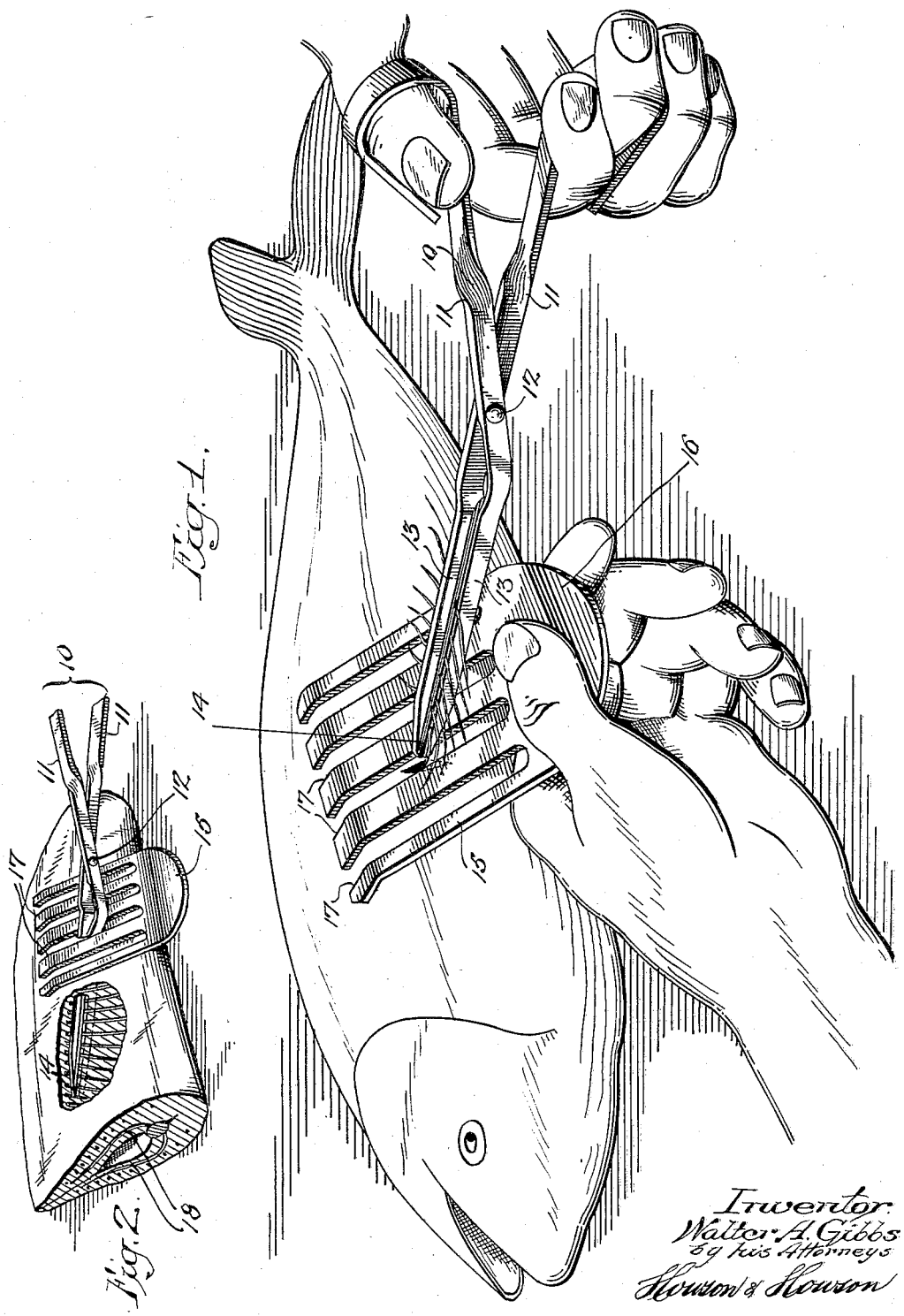

2,224,045

UNITED STATES PATENT OFFICE 2,224,045

APPARATUS FOR BONING FISH

Walter A. Gibbs, Holly Oak, Del.

Original application July 14, 1939, Serial No. 284,555. Divided and this application October 21, 1939, Serial No. 300,620

5 Claims. (Cl. 17—7)

This invention relates to an apparatus for boning fish and has for an important object thereof the provision of a structure whereby all of the minor bones of a fish, even those having complex bony structures such as shad, may be removed without destroying the shape or appearance of the fish.

Certain of the bones of a fish as, for example, the rib bones are readily accessible through the body cavity and by use of an apparatus including an implement such as that illustrated in my prior application Serial No. 224,379, filed August 11, 1938, for "Method and apparatus for removing bones from fish," may be grasped and removed as a unit. Other bones of the fish, particularly in the case of fish such as shad, are, however, so located that they cannot be removed through the body cavity, and a specific object of this invention is to provide means for removing these bones.

In the normal state, these bones adhere firmly to the flesh and, accordingly, any attempt to remove them would, ordinarily, tear the flesh severly and destroy the contours of the fish. I have found that if the fish, after cleaning, is steamed for a few minutes, five to ten minutes being sufficient for a fish of five or six pounds, these bones are freed. While this treatment does not cook the fish to any appreciable extent or destroy its shape or appearance, it results in loosening of the flesh from the bones so that the bones may be much more readily withdrawn. This method I have claimed in my prior application Serial No. 284,555, for "Method of boning fish," filed July 14, 1939, of which the present application is a division.

In accordance with my present invention, I employ, in addition to an instrument such as that shown specifically in Figures 1, 2 and 3 of my prior application Serial No. 224,379 above identified, a shield for engaging the body of the fish and through which the pointed jaws of this implement may be inserted to engage the inaccessibly located or floating bones of the fish. An apparatus constructed in accordance with my invention is illustrated in the accompanying drawing wherein:

Fig. 1 is a perspective view illustrating withdrawal of the minor bones of the fish by use of my apparatus; and Fig. 2 is a fragmentary perspective partially broken away illustrating the manner of grasping the bones.

As shown in the drawing, I employ a scissor-like clamping extractor 10 such as that illustrated in my copending application Serial No. 224,379 above identified, this extractor comprising a pair of pivoted lever elements 11, the ends of the lever elements at one side of the pivot 12 comprising clamping jaws or gripping means 13 having their free ends somewhat pointed, as indicated at 14 to facilitate their insertion in the fish through the skin thereof with the formation of the smallest possible incision. The opposite ends of the levers merely constitute elements by means of which the clamping jaws may be manipulated. In combination with a tool of this character I employ a plate 15 one end of which may be formed as a hand grip 16 and the remainder of which is adapted to engage the body of the fish. This plate has openings 17 therein, through which the gripping jaws 13 are inserted in the fish to grasp the bones. The openings of the plate preferably comprise slots opening through an edge thereof since this will permit of insertion of the pointed jaws of the implement 10 and subsequent positioning of the plate. They may, however, constitute true openings of any desired configuration.

It will be obvious that the plate will serve to prevent tearing of the flesh and skin of the fish as the implement 10 is withdrawn with the bones in position therein as shown in Fig. 1. The ribs 18 may, of course, be grasped through the body cavity for removal therefrom. Following removal of the bones, the fish may be cooked in any desired manner as, for example, baked, broiled or fried.

I have hereinbefore described the preparation by preliminary cooking, but it will, of course, be understood that while my apparatus may be most advantageously used in conjunction with the method of the parent application herein identified, it may also be conveniently employed in removing bones from fish prepared in other manners and I, accordingly, do not wish to be understood as confining its use to that method.

Since the construction is obviously capable of considerable modification, the present showing is to be taken as purely illustrative and not limiting.

I claim:

1. Apparatus for boning fish comprising in combination a plate adapted to engage the body of the fish and having openings therein, and gripping means insertible through the openings of said plate and into the body of the fish to engage the bones therein.

2. Apparatus for boning fish comprising in combination a plate adapted to engage the body of the fish and having openings formed therein, and a clamp comprising a pair of thin pointed jaws insertible through the openings of said plate into the body of the fish to grip the bones thereof and means for manipulating said jaws.

3. In apparatus for boning fish, means insertible through the body wall of the fish to engage and remove therefrom bones which are remotely situated therein, and means to engage the body of the fish about the inserted withdrawing means to prevent disfigurement of the outer wall by removal of the bones therethrough by the first-named means.

4. A device as claimed in claim 1 wherein the openings of the plate comprise slots opening through an edge thereof.

5. A device as claimed in claim 2 wherein the openings of the plate comprise slots opening through an edge thereof.

WALTER A. GIBBS.